US006480948B1

(12) United States Patent
Virajpet et al.

(10) Patent No.: US 6,480,948 B1
(45) Date of Patent: Nov. 12, 2002

(54) CONFIGURABLE SYSTEM MEMORY MAP

(75) Inventors: Balaji V. Virajpet, San Jose; Kaushik L. Popat, Pleasanton, both of CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/339,638

(22) Filed: Jun. 24, 1999

(51) Int. Cl.[7] .............................................. G06F 12/00
(52) U.S. Cl. ...................................................... 711/202
(58) Field of Search ................................. 711/202, 165, 711/106, 170, 134, 203, 204, 205, 206, 207, 208, 209, 210; 710/26; 713/100

(56) References Cited

U.S. PATENT DOCUMENTS

| 5,546,554 A | * | 8/1996 | Yung et al. ................... 395/413 |
| 5,860,079 A | * | 1/1999 | Smith et al. ...................... 711/4 |
| 5,996,054 A | * | 11/1999 | Ledain et al. ................ 711/203 |
| 6,012,106 A | * | 1/2000 | Schumann et al. ............ 710/22 |
| 6,021,477 A | * | 2/2000 | Mann .......................... 711/167 |
| 6,078,984 A | * | 6/2000 | Bubeck ........................... 711/5 |
| 6,134,641 A | * | 10/2000 | Anand .......................... 711/202 |
| 6,157,975 A | * | 12/2000 | Brief et al. .................. 710/104 |
| 6,192,487 B1 | * | 2/2001 | Douceur ......................... 714/8 |

* cited by examiner

Primary Examiner—Kevin L. Ellis
Assistant Examiner—C. P. Chace
(74) Attorney, Agent, or Firm—Dan A. Shifrin

(57) ABSTRACT

A memory map for a computer system is configurable. For example a first section of the memory map (e.g., the lower address space) is configurable so that when the process accesses this section, different devices will respond depending on the memory map in effect. In one embodiment, external non-volatile memory is accessed during a first time period based on a reset memory map. After initialization, the memory may is changed to a normal one so that subsequent accesses to the same section of the memory map result in accesses to faster memory (e.g., internal SRAM). In the case where the reset vector and interrupt vectors have relatively close addresses, the configurability of the memory map allows the reset vector to be handled through accesses to non-volatile memory while interrupt vectors are handled through accesses to faster internal SRAM.

14 Claims, 4 Drawing Sheets

CONFIGURABLE SYSTEM MEMORY MAP

BACKGROUND OF THE INVENTION

The present invention pertains to a configurable system memory map. More particularly, the present invention pertains to the modification of a memory map so as to improve performance in a computer system or the like.

In a computer system or the like, a memory map may be created which reflects the addressability of devices coupled together in a system including a processor. For example, a computer system or the like may include a processor that accesses a variety of addressable components such as the following: a buffer memory, an internal and/or external Read-Only-Memory (ROM), one or more peripherals, internal or external static random access memory (SRAM), etc. In some cases both memory devices and input/output devices are accessed from the same memory map. In other words each address identifies either a location in an internal or external device, or identifies a different type of device such as a peripheral device (or a storage area in the peripheral device).

The memory map is especially important during reset and interrupt processing. As is known in the art, when a processor is reset, the processor will look for instructional code to execute at a certain memory location. For example, with a 32-bit address space, the processor may first access address 00000000 (hex) for the first instruction code to be executed so as to set up the processor to execute additional code (one skilled in the art may refer to this initial code as a "boot-up" or initialization sequence of code). Because a reset condition typically occurs after a power-down/power-up sequence, it is necessary that the first address accessed after reset be in non-volatile memory.

Many processors also receive interrupt inputs which will cause the processor to stop execution of the code sequence currently being executed and to jump to another, preset address. In many processors, the preset address is a relatively low address like the reset address (e.g., the example above, 00000000(hex)). For example, an interrupt address could be 00000100 (hex). Then, the processor can execute code at this address. The processor may continue to execute instruction codes at sequential address locations, or the instruction code stored at the interrupt address may cause the processor to jump to another address for instruction codes to be executed to handle the interrupt. When execution of the code to handle the interrupt is completed, the processor returns to the execution of code that was previously interrupted.

As stated above, the reset address and the interrupt addresses (sometimes individually referred to as vectors) are typically located relatively close together at the lower or upper part of the address space. Since the reset vector must point to valid instruction code, it usually points to a non-volatile memory device. It is expected, then, that the interrupt vectors will also point to the same non-volatile memory device. Furthermore, the non-volatile memory may be an external device because on-chip, rewritable non-volatile memory may not be available in the IC technology used and the code may not be available at the time of fabrication of the chip to use internal ROM. A problem that is seen with this kind of configuration is that code execution on interrupts may occur with external, non-volatile memory that provides a slower access time when compared to other types of memory such as an internal SRAM device. In applications where interrupts must be handled at high speed, or must be dynamically changed during normal system operation, continuous access to the non-volatile memory space (e.g., an external ROM) during interrupt processing may not be acceptable. Though the first instruction(s) from the ROM may cause a jump to a different memory address (e.g., a memory address that points to a faster memory device), these initial accesses can waste processing time and negatively impact performance.

In view of the above, there is a need for an improved method and apparatus for a computer system using a memory map.

SUMMARY OF THE INVENTION

According to an embodiment of the present invention, a configurable memory map is provided. During a first condition, such as during a reset, the memory map is in a first configuration so that access to a first portion of the memory space (e.g., for a reset vector) results in an access to a first memory device. During a second condition (e.g., during normal processing), the memory map is in a second configuration (e.g., through the operation of a bus controller) so that accesses to the same portion of the memory space result in accesses to a second memory device (e.g., during interrupt processing). Using such a configurable memory map can result in improved performance for the computer system. For example, accesses by a processor during a reset operation will result in accesses to non-volatile memory (e.g., a ROM) while accesses by the processor during interrupt processing will result in accesses to faster memory devices (e.g., an internal SRAM) even though the reset and interrupt vectors are in the same portion of the memory space. In addition, access to the first memory device and access to the second memory device are available in other fixed portion of the memory devices to facilitate initialization of the volatile memory device (e.g., internal SRAM) after reset.

DETAILED DESCRIPTION

Figure 1:
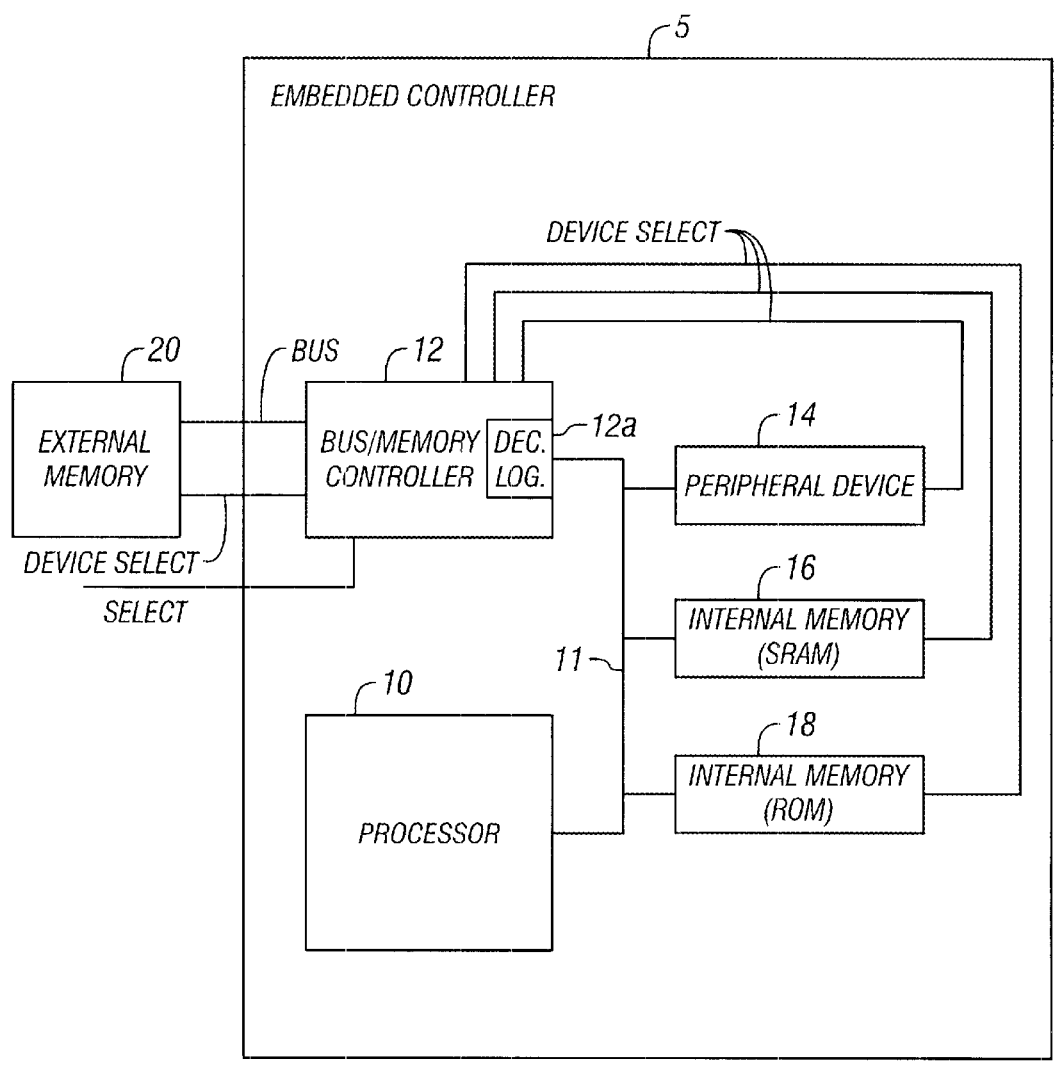
FIG. 1 is a block diagram of a computer system that uses a configurable memory map according to an embodiment of the present invention.

Referring to FIG. 1, a computer system that uses a configurable memory map according to an embodiment of the present invention is shown. In this embodiment, a computer system is provided including an embedded controller 5. One skilled in the art will appreciate that other computer systems may be used with the configurable memory map of the present invention. Embedded controller 5 includes a processor 10, coupled to a bus 11. Bus 11 provides address/data/command communication among a variety of components in the computer system such as an internal memory (ROM) 18, an internal memory (SRAM) 16, and a peripheral device 14. A bus/memory controller 12 is provided for controlling the configuration of the memory map and the communication between bus 11 and external memory (e.g., RAM or ROM) 20.

Figure 2:
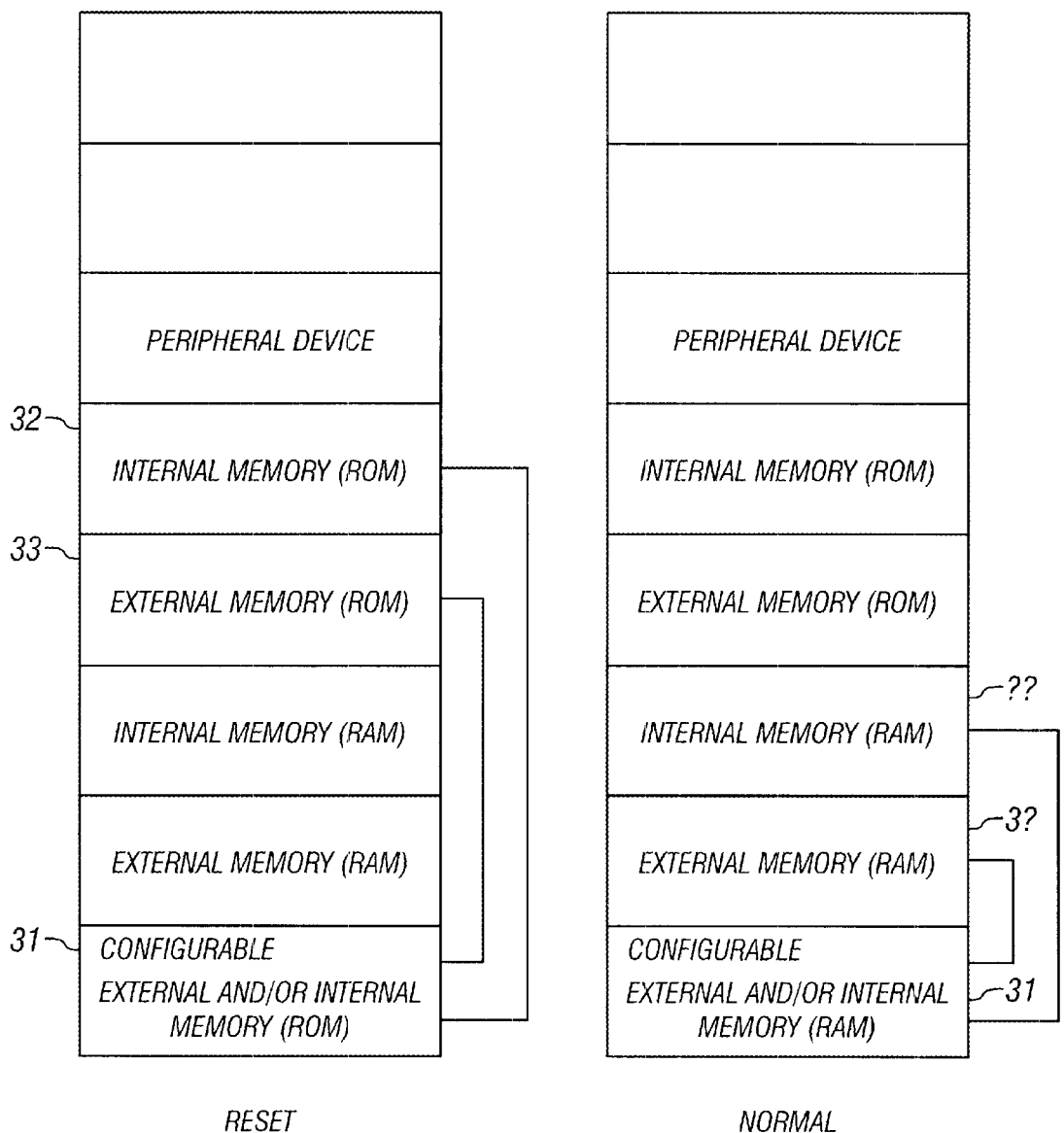
FIG. 2 is a schematic drawing showing two configurations of a memory map for the computer system of FIG. 1 according to an embodiment of the present invention.

Referring to FIG. 2, two memory maps for the computer system of FIG. 1 are shown. In both memory maps, a subset or section of addresses are set aside for each of the devices of the computer system. For example, sections of addresses are assigned to internal and external ROM while sections of addresses are assigned to internal and external RAM. A first section 31 of the memory map (e.g., the lowest addresses of the memory space) is configurable. Accordingly, during a first time period (e.g., after reset), the configurable section is aliased so that when processor 10 seeks to access to this section, the access actually occurs to internal ROM (e.g., element 18) and/or external ROM (e.g., element 20) under the control of the bus/memory controller 12. Thus, after reset, when processor 10 seeks to access address 00000000 (hex), the access will be directed to non-volatile memory (e.g., ROM) that is presumably unaffected by a reset condition.

At a second time period (e.g., after all preliminary operations associated with the reset condition are completed), the bus/memory controller 12 reconfigures the memory map to a second configuration. Again, the first section of addresses is configurable, and in this situation it is aliased so that accesses to this section actually occur to internal RAM (e.g., element 16). Thus, accesses for interrupt vectors or interrupt code will be to a relatively fast SRAM memory device instead of a relatively slower non-volatile memory device (e.g., to external ROM). Also, interrupt vector code can be changed during normal operation As seen in FIG. 2, the first section 31 is a configurable alias of one of the other sections of the memory map. During the reset time period, accesses to the first section 31 of the memory space are equivalent to accesses to another section(s) of the memory space (e.g., section 32 and/or section 33). Likewise, during the normal time period, accesses to the first section 31 of the memory space are equivalent to accesses to other section(s) of the memory space (i.e., section 34 and/or section 35). This may be of an advantage because, as the memory map is switched from one configuration to another, addresses to section 32–35 are unaffected even though the configurable section changes. Hence, processor 10 can execute from the fixed space without any disturbance and alter the configurable space safely. In absence of this fixed alias space, switching the memory map becomes difficult since this code section will point to a different memory device after the switch, and the code execution has to run sequentially. Accordingly, though low addresses (in this embodiment) refer to a first device in a first memory map configuration and a second device in a second configuration, the normal addresses (i.e., the addresses to sections 32–35) also refer to these components, meaning that no address translation is necessary, even when switching to another memory map configuration.

Referring back to FIG. 1, the aliasing seen in the memory maps of FIG. 2 can be achieved through a plurality of Device Select signal lines. In this embodiment, the Device Select lines are sideband signals (i.e., not part of bus 11) coupled between the bus/memory controller 12 and each of the devices in the computer system. When the processor 10 seeks to access an address (placed on bus 11), the bus/memory controller 12 decodes the address using decode logic 12a. Depending on which memory map is currently in effect (e.g., the reset map or the normal map shown in FIG. 2), the bus/memory controller sends the appropriate Device Select signal(s) to appropriate devices. For example, if after reset, the processor seeks to access address 00000000(hex), the bus/memory controller would send a Device Select signal to the Internal ROM 18 or the External Memory 20.

The selected device would then return the requested data. Accordingly, depending on the action of the bus/memory controller 12, the correct device responds to the accesses of the processor 10.

According to an alternative embodiment of the present invention, the bus/memory controller 12 can access either the internal ROM or the external ROM upon reset. This can be achieved through pin strapping a Select signal line to the controller 12. When the Select line is coupled to ground (e.g., a logical "0"), an access by processor 10 to address 00000000(hex) will cause an access to an external memory such as external memory 20 for the initialization or boot code. If the Select line is set to a logical "1" (either by connecting it to a voltage source or leaving it unconnected in some situations), an access to address 00000000(hex) by the processor 10 will cause an access to an internal memory (e.g., internal ROM 18). As with the configurable memory map, the bus/memory controller controls the aliasing in this case. Use of the Select signal in this manner can be advantageous, for example, in that if there are changes that need to be made to the reset code instructions, those changes may be more easily made in external memory 20 compared to internal ROM 18.

During a boot sequence, the following initialization steps may take place through execution of code stored in the internal or external ROM: 1) jump to the normal fixed location of the ROM (e.g., section 31 in FIG. 2); 2) load the appropriate code including interrupt vector code from the ROM to the internal RAM (element 16 in FIG. 1); 3) switch the memory map to the normal map so that the configurable section (element 31 in FIG. 2) is now an alias of the internal or external RAM memory (as described below this can be achieved by writing a particular value to a particular address in the bus/memory controller 12); and 4) complete the initialization of all subsystems of the computer system.

As stated above, one method for causing the bus/memory controller 12 to change between a reset memory map and a normal memory map can be through the changing of a value in a preselected register of the bus/memory controller. After the processor has completed the initialization operation, it can than write an appropriate value to this register at a preselected address. The bus/memory controller checks this value to determine whether to change the memory map.

The present invention may be used in an embedded controller to control a memory system such as a hard-disk drive. In such an embodiment, the processor may control one or more peripheral devices such as a disk controller, a read channel and a servo control device. In an environment such as a hard-disk drive, it may become imperative that the embedded controller respond quickly (e.g., in real time) during interrupt processing. With the embodiments of the present invention, the interrupt processing can be handled faster than in other systems because interrupt instruction code may be accessed immediately from fast-access internal SRAM (for example) instead of a combination of volatile and non-volatile memory devices.

Figure 3:
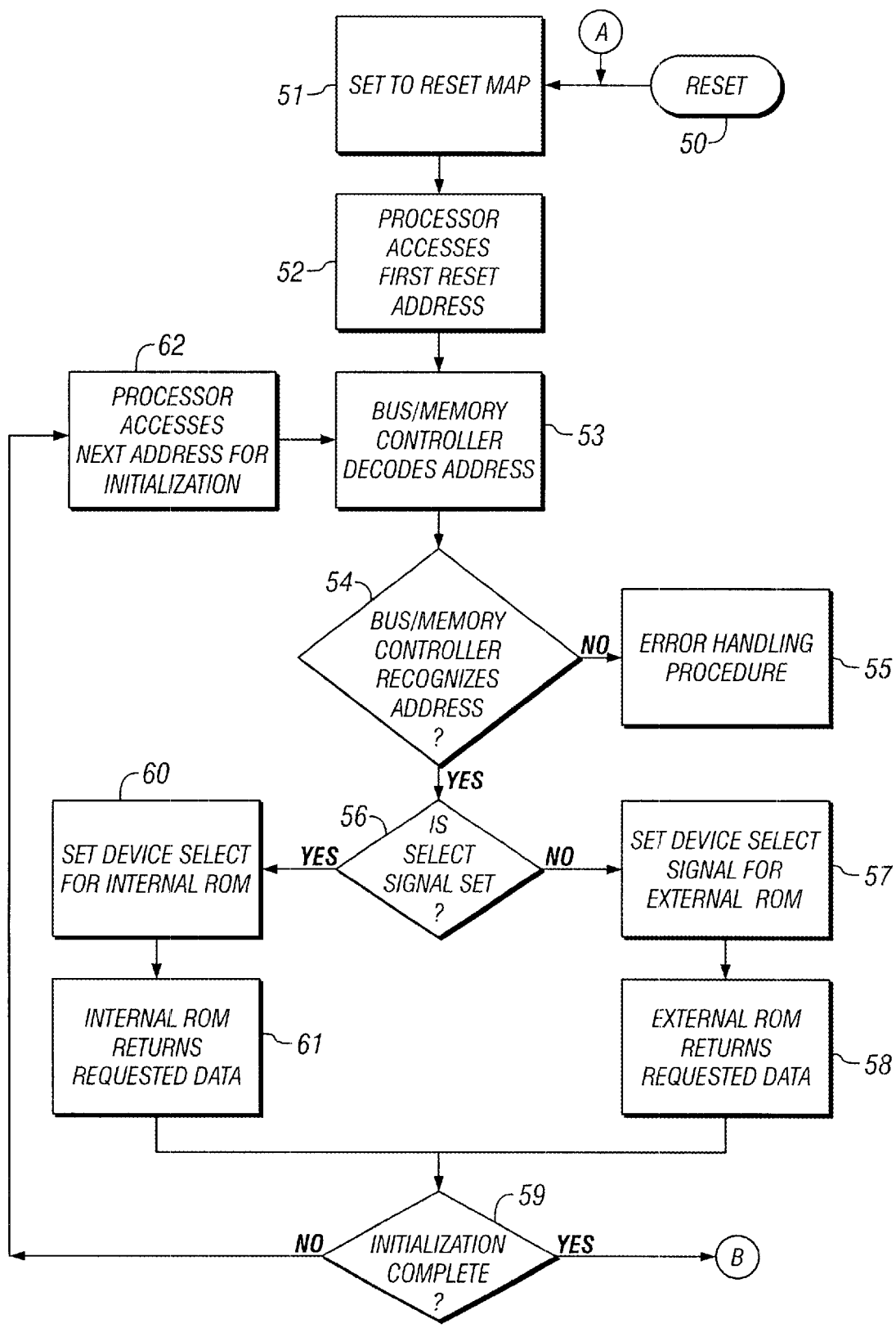
FIG. 3 is a flow diagram depicting an initialization operation according to an embodiment of the present invention.
Figure 4:
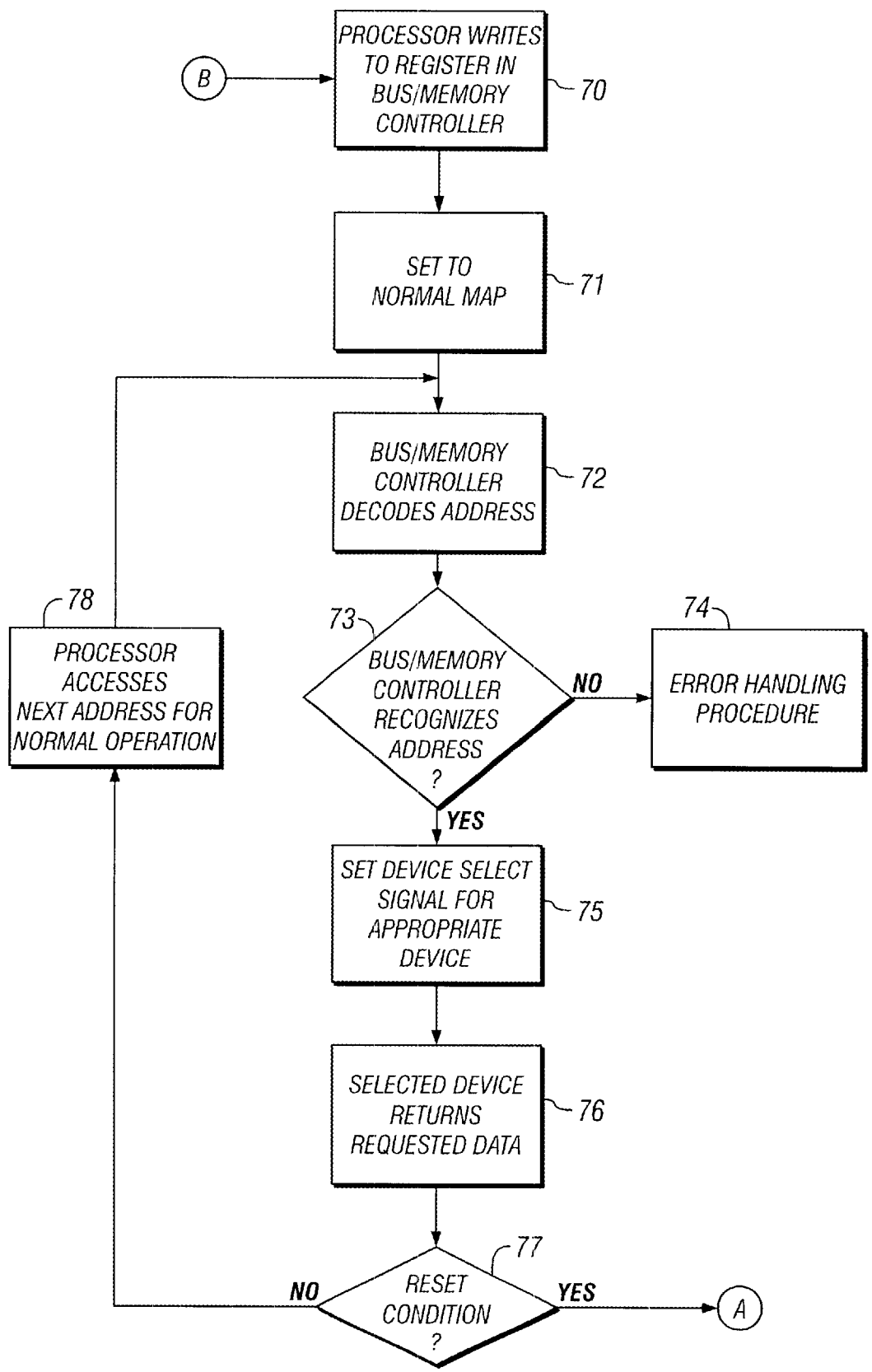
FIG. 4 is a flow diagram depicting a normal operation according to an embodiment of the present invention.

Referring to FIGS. 3 and 4, flow diagrams are presented depicting a method of operation of the computer system of FIG. 1 according to an embodiment of the present invention. In FIG. 3, after reset (step 50), the bus/memory controller 12 sets the memory map to a reset map (step 51). In step 52, processor accesses the first reset address (e.g., 00000000 (hex)). In step 53, the bus/memory controller 12 decodes the address and determines whether it recognizes the address (e.g., is the address valid?). If it does not recognize the address, the control passes to step 55 for an error handling procedure. According to the reset memory map, this address points to non-volatile memory. It is then determined which non-volatile memory to access in decision block 56 by checking the Select signal. If this signal is not set, control passes to step 57 where the bus/memory controller sets Device Select signal for the external ROM (element 20 in FIG. 1) and this device then returns the requested data (step 58, e.g., the first instruction code to be executed by processor 10). In decision block 59, it is determined whether the processor 10 has completed its initialization operation. If it has not, then control passes to block 62 where the processor accesses the next address for initialization. Returning back to decision block 56, if the Select signal is set, then control passes to step 60 where the Device Select Signal from the internal ROM 18 is set, and in step 61, this device returns the requested data (e.g., the first instruction code).

Referring to FIG. 4, once the initialization operation is complete, control passes to step 70 where the processor writes an appropriate value to a particular register in the bus/memory controller 12 to cause it to switch to the normal memory map (step 71). In step 72, the bus/memory controller decodes the next address from the processor 10. If the address is not recognized by the bus/memory controller 12 (decision block 72), then an error handling procedure is performed (step 74), if the address is recognized, the bus/memory controller sets the appropriate Device Select signal based on the normal memory map. For example, if the processor is accessing an interrupt vector at address 0000001C(hex), the bus/memory controller would set the Device Select signal for the internal SRAM memory 16, for example, according to the normal memory map. Accordingly, because the memory map has been changed, accesses to the lower section of the addressable space result in accesses to the relatively fast internal SRAM rather than the slower external non-volatile memories, improving performance. In step 76, the selected device returns the requested data. In decision block 77, it is determined whether there is a reset condition, if there is not, control passes to step 78 for accessing the next address for normal operation. If there is a reset condition, control passes to step 51 (FIG. 3) to have the bus/memory controller 12 change the memory map to a reset map.

Although embodiments are specifically illustrated and described herein, it will be appreciated that modifications and variations of the present invention are covered by the above teachings and within the purview of the appended claims without departing from the spirit and intended scope of the invention. For example, though in the embodiments described above, an embedded controller is described, the present invention may be used on other computer systems. Also, though in the described embodiments a single memory map defines the computer system, the present invention is not so limited. Also, though only two devices are shown utilizing the configurable space in this example, the present invention can be expanded to three or more devices in accordance with the description above.

What is claimed is:
1. A computer system comprising:
   a processor;
   a plurality of devices accessible by said processor via one or more addresses; and
   a bus controller coupled to said processor and said plurality of devices, said bus controller adapted to configure a memory map of said addresses for said computer system wherein a first device is accessible by said processor via a first subset of addresses in said memory map and a second device is accessible by said processor via a second subset of addresses in said memory map wherein
      during a first time period, said bus controller configures a third subset of addresses in said memory map such that said processor accesses said first device when said processor seeks to access said third subset of said addresses; and
      during a second time period, said bus controller configures the third subset of addresses in said memory map such that said processor accesses said second device when said processor seeks to access said third subset of said addresses.

2. The computer system of claim 1 wherein said first device is a non-volatile memory device.

3. The computer system of claim 2 wherein said second device is a Random-Access-Memory (RAM) device.

4. The computer system of claim 1 further comprising:
   a plurality of device select lines coupled between said bus controller and said plurality of devices such that said bus controller controls which of said devices responds to accesses by said processor via said device select lines based on said memory map.

5. The computer system of claim 4 wherein said first device is a non-volatile memory device.

6. The computer system of claim 5 wherein said second device is a Random-Access-Memory (RAM) device.

7. The computer system of claim 3 further comprising:
   a select signal line coupled to said bus controller, such that said bus controller selects the first device from said plurality of devices based on a signal on said select signal line.

8. The computer system of claim 7 wherein said first device is selected from non-volatile memory internal to said computer system and non-volatile memory external to said computer system based on the signal on said select signal line.

9. A method of controlling a computer system including a processor, a plurality of devices accessible by said processor via one or more addresses and a bus controller coupled to said processor and said plurality of devices wherein a first device is accessible by said processor via a first subset of addresses in said memory map and a second device is accessible by said processor via a second subset of addresses in said memory map, the method comprising:
   configuring a third subset of addresses in said memory map during a first time period by said bus controller such that said processor accesses said first device when said processor seeks to access said third subset of said addresses; and
   configuring the third subset of addresses in said memory map during a second time period by said bus controller such that said processor accesses said second device when said processor seeks to access said third subset of said addresses.

10. The method of claim 9 further comprising
   controlling which of said devices responds to accesses by said processor based on said memory map via a plurality of device select lines coupled between said bus controller and said plurality of devices.

11. The method of claim 9 further comprising:
   selecting the first device from said plurality of devices based on a signal on a select signal line coupled to said bus controller.

12. The method of claim 10 further comprising:
   selecting the first device from said plurality of devices based on a signal on a select signal line coupled to said bus controller.

13. A computer system comprising:

a processor;

a plurality of memory devices accessible by said processor via one or more addresses, a second memory device having a faster access speed than a first memory device; and a bus controller coupled to said processor and said plurality of memory devices, said bus controller adapted to configure a memory map of said addresses for said computer system wherein said first memory device is accessible by said processor via a first subset of addresses in said memory map and said second memory device is accessible by said processor via a second subset of addresses in said memory map, wherein:

when said processor receives a reset command, said bus controller configures a third subset of addresses in said memory map such that said processor accesses said first memory device when said processor seeks to access said third subset of said addresses; and when said processor receives an interrupt command, said bus controller configures the third subset of addresses in said memory map such that said processor accesses said second memory device when said processor seeks to access said third subset of said addresses.

14. The computer system of claim 13, wherein:

said first memory device is a non-volatile memory device; and said second memory device is a Random-Access-Memory (RAM) device.

\* \* \* \* \*